United States Patent [19]

Reiser et al.

[11] Patent Number: 4,722,619
[45] Date of Patent: Feb. 2, 1988

[54] MOUNTING ASSEMBLY FOR BEARING RACES

[75] Inventors: Kurt Reiser, Offenbach am Main; Werner Jacob, Frankfurt, both of Fed. Rep. of Germany

[73] Assignee: M.A.N.-Roland Druckmaschinen Aktiengesellschaft, Fed. Rep. of Germany

[21] Appl. No.: 876,817

[22] Filed: Jun. 20, 1986

[30] Foreign Application Priority Data

Jun. 22, 1985 [DE] Fed. Rep. of Germany ....... 3522461

[51] Int. Cl.$^4$ ..................... F16C 35/063; F16C 43/04; B25G 3/00
[52] U.S. Cl. ............... 384/585; 29/148.4 A; 29/509; 29/515; 403/261; 403/360
[58] Field of Search ............... 384/502, 503, 510, 513, 384/537, 559, 560, 569, 570, 585, 615, 617, 620, 622; 29/148.4 A, 148.4 R, 149.5 R, 223.5, 509, 515, 243.5; 403/261, 360

[56] References Cited

U.S. PATENT DOCUMENTS 3,328,097 6/1967 Wilson ............................... 384/560
3,975,067 8/1976 Martin ........................ 29/148.4 R X

FOREIGN PATENT DOCUMENTS 346934 4/1931 United Kingdom ............... 384/537

Primary Examiner—David Werner
Attorney, Agent, or Firm—Leydig, Voit & Mayer

[57] ABSTRACT

A mounting assembly for bearing races is provided which enables split races for roller bearings to be fixed on a bearing member in a space-saving system wherein the bearing member includes at least one race groove parallel to two expanding grooves such that narrow webs are left on either side of the race groove. On assembly, for example, of the inner ring of a roller bearing in the race groove, these webs are flanged or crimped against the bearing end faces such that two ends of the axially split bearing race are securely held by appropriate profiling or beveling of the end faces of the race. Assembly may be carried out by inserting a crimping wheel into the expanding grooves and crimping the webs by means of a conically deforming surface. The mounting can be advantageously applied, for example, in connection with an eccentrically drilled bearing bushing for the plain bearings of blanket cylinders in offset printing machines.

7 Claims, 3 Drawing Figures

MOUNTING ASSEMBLY FOR BEARING RACES

FIELD OF THE INVENTION

The present invention relates generally to a method for mounting bearing races and more particularly concerns a mounting using races which are axially divided in at least one place and fixed in a bearing bore or on a journal.

BACKGROUND OF THE INVENTION

Rotating machine parts must sometimes be mounted in constricted space conditions. Consequently, assembly and dismantling facilities are greatly restricted. When designing such machine parts, an attempt is therefore made to limit the overall area as much as possible. One system that has previously been adopted is to separate the bearing unit of such machines in some way so that the individual elements can be installed consecutively.

Various methods of solving the above problem have been disclosed. For example, one method is to divide roller bearings axially into a top and bottom bearing half. These two bearing halves then have to be connected using relatively expensive clamping means. It has been proposed, for example, that the inner race of a roller bearing divided in the prescribed manner should be clamped on a shaft by means of clamp rings on both sides of the bearing surface. The outer race, which is also divided, is retained by means of a bearing housing. With this construction it is very important that the bearing joint should not lie in the load-carrying zone. The joint must also be very accurately machined.

A further improvement of the way in which rolling bearings can be installed is possible either by forming the rolling member running surfaces directly in one of the parts required to be mounted, or by forming the rolling bearing raceway in one of the two parts required to be mounted.

A disadvantage of forming the raceway directly on one of the parts for mounting is that the entire part for mounting must then be made from the relatively hard, high-grade material of a rolling bearing race if it is not to wear prematurely. The fitting of high-grade races in a softer, lower-grade basic material, on the other hand, has advantages. A solution of this kind is described in DE-OS 24 22 488, in which a double contact bearing is described for balls or superimposed rollers, consisting of raceways inserted in holders. The holders are made from a material different from the raceways. The race may be made from a single profiled bar and can be subjected to different heat treatments independently of the mounting. It is usually connected at the abutting ends by an oblique cut. This enables the resulting race to be opened up and contracted for assembly in the holder. This proposed solution, however, gives rise to various problems. First, care must be taken to ensure that the groove provided in the holder for the race corresponds exactly to the race width. Otherwise, the bearing may undergo axial shifting in excess of its tolerances ultimately resulting in damage to the bearing. Furthermore, a mounting of this kind is not secured against peripheral shifting in its seat. Thus the bearing tolerances can continually shift and again lead to bearing breakdown after a relatively short time. A second problem lies in connecting the two ends of the bearing sections. According to the method shown in the above-mentioned specification, as a result of the elasticity of the bearing material, a relatively large gap is inevitably left. Thus another place is created where bearing damage may occur. Finally, the mounting described does not save any space. This is true not only because the installation is conventional but also because the bearing itself occupies more space than a conventional bearing. At most, this method is suitable only for large-volume bearings where it is desired to save on valuable high-grade material.

OBJECTS AND SUMMARY OF THE INVENTION

The primary object of the invention, therefore, is to provide a mounting for races in a bearing, which is not only economical in terms of space, but also is highly resistant to wear and easily assembled, no additional means being required to mount the races in the bearing.

This problem is solved according to the present invention by simple mountings which enable axially split races for roller bearings to be mounted on a bearing member in a space-saving system wherein the bearing member is provided with at least one race groove between two parallel expanding grooves such that narrow webs are left on either side of the race groove. After assembly of a split inner race of a roller bearing in the race groove, for example the webs are flanged or crimped against the bearing end faces such that the split ends of the inner race are securely held together in the race groove. Assembly may be carried out by inserting a crimping wheel into the expanding groove and crimping the webs by means of a conically-shaped deforming surface.

The mounting described here has various advantages. First, the use of axially split races ensures that the connection between the two race ends, i.e. the race joint, is completely free of any sharp edges such that the smoothness of the running of the bearing is indistinguishable from a normal undivided bearing. Second, the deformation of the two webs on either side of the race groove so that they abut the end faces of the race ensures that the race is held firmly in position and substantially level with the periphery of the bushing. This obviates any shifting of the race in the mounting as a result of elastic deformation.

Third, the method required to assemble the race is very simple and makes no great demands for accuracy or special knowledge. Fourth, the construction described for mounting races allows a bearing race to be completely integrated in the bearing member. Thus, the overall area of the bearing is reduced by approximately one third. Also, the race material selected may be a hardened, high-grade bearing steel while the material of the bearing support member may be quite different and adapted to other requirements. This method of mounting races is particularly advantageous when applied to eccentrically drilled bearing bushings for the plain bearings of blanket cylinder in offset printing machines. Finally, the problem of keeping the cost of the bearing at a minimum is easily solved according to this invention since the bushing wall is made as thin as possible and consists of an inexpensive and easily machined material.

These and other features and advantages of the invention will be more readily apparent upon reading the following description of a preferred exemplified embodiment of the invention and upon reference to the accompanying drawings wherein:

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE PREFERRED EMBODIMENTS

Figure 1:
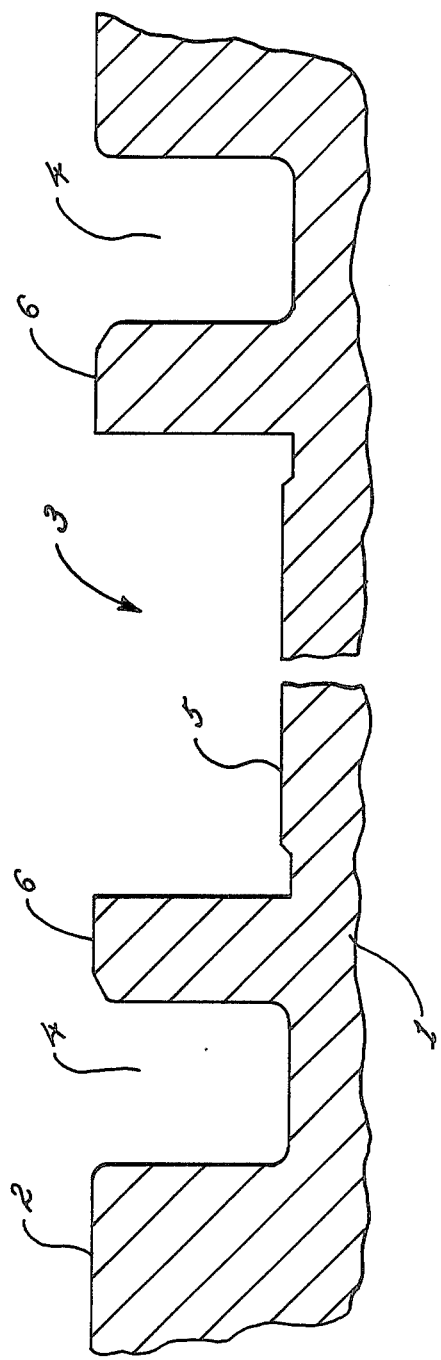
FIG. 1 illustrates a mounting member made in accordance with the invention for thefitting of a bearing race.

Referring now to FIG. 1 of the drawings, a mounting member or journal 1 is shown in a finished machined state and is prepared for the mounting of a roller bearing race. The member 1 has grooves formed in its outer periphery 2. One race groove 3 and two expanding grooves 4 are disposed uniformly parallel to each other. The base of the race groove 3 has a bearing surface 5 which is stepped-down slightly at its lateral boundaries in order to ensure a satisfactory fit for the bearing race which is to be secured therein. A narrow web 6 is left between the race groove 3 and each of the two expanding grooves 4.

Figure 2:
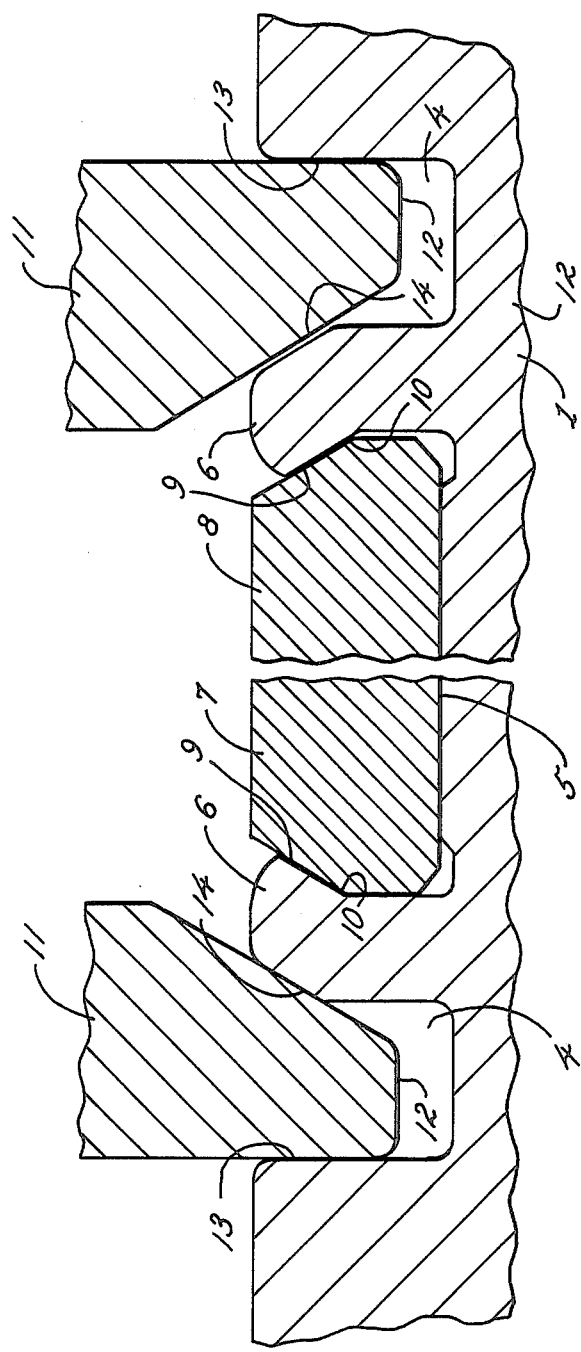
FIG. 2 is a sectional view through an assembled mounting showing the assembly tools used.

FIG. 2 shows the method of fitting a race into the mounting. The race being fitted in this case is the inner ring 7 of a cylindrical roller or needle bearing. The inner ring 7 is axially split or burst, i.e. deliberately broken, at one point about its circumference. The break is not shown. The hardened inner ring 7 can be expanded to such an extent that its elasticity will allow it to be fitted on the member, even if individual zones project webs 6 on the journal as shown in FIG. 1. In other words, the inner ring 7 must be expanded to be larger than the outside diameter of the journal 1 in the zone of its outer periphery 2 so that it can be fitted over the webs 6 and into the groove 3.

Within the groove 3, the inner race 7 rests on the bearing surface 5 and its end faces are bounded by the radially projecting webs 6. some clearance is necessary at the end faces for assembly reasons, the inner ring 7 fits relatively loosely, particularly since it is held together at the break only by its low natural elasticity. In this condition, therefore, it cannot be used as a race.

In order now to fix the race 7 in the race groove 3, it is clamped between the webs 6. To this end, the end faces of the inner race 7 are provided with bevels 9 sloping towards the running surface 8. The webs 6 are deformed around the inner edges 10 of these bevels 9 so as to bear against the latter. The inner ring 7 is thus held fast on the bearing surface as if it were clamped. Neither radial nor axial movement is possible with respect to the journal 1. The break on the inner ring 7 is closed so that there is no joint. In place of the bevels 9 it is possible to use profiles in the form of grooves at the end faces of the inner ring 7. The disadvantage of rather difficult machining would then be offset by the advantage of better utilization of the ring width for the running surface 8. The operation of the bearing, however, would still be the same.

In order to deform the webs 6, a conically tapering assembly tool is preferably used as suggested in FIG. 2. The tool may, for example, be in the form of a crimping wheel 11. The crimping wheel 11 as shown must be narrower at the outer periphery 12 than the expanding grooves 4 so that it can be inserted therein. In order to achieve the desired conditions during the crimping or deformation of the webs 6, the wheel 1 should have a support surface 13 normal to the wheel axis on one side and a conically shaped deforming surface 14 at a relatively acute angle of about 35° to the support surface 13 on the other side. For assembly purposes the crimping wheel 11 is inserted into one of the expanding grooves 4 and subjected to radial loading in relation to the journal 1 and parallel to the support surface 13 until the webs 6 undergo plastic deformation and abut the bevel 9 on the end face 10 of the bearing 7. Under these conditions the clearance in the race groove 3 transversely of the inner race 7 is eliminated and the inner race 7 is pressed against the second web 6.

The web 6 is then completely crimpled or flanged over against the inner race 7 by rotation of the journal 1 and/or movement of the crimping wheel 11 along the periphery. The axial retaining force of the crimping wheel 11 is taken by the support surface 13. After the first web has been crimped the second web 6 is then also crimped. As illustrated in FIG. 2, this operation can also be carried out using two crimping wheels 11 in order to save time. In this case, however, care must be taken to ensure that the application force for the crimping wheels 11 is greater on one side than on the other so that the axial clearance of the inner race 7 is eliminated in the same direction throughout the operation. The mounting operation can also make use of a simpler stationary tool, the effective zone of which corresponds to the section of the crimping wheel 11. In this case, however, relatively high frictional forces occur entailing considerable loading on the bearing zone.

Figure 3:
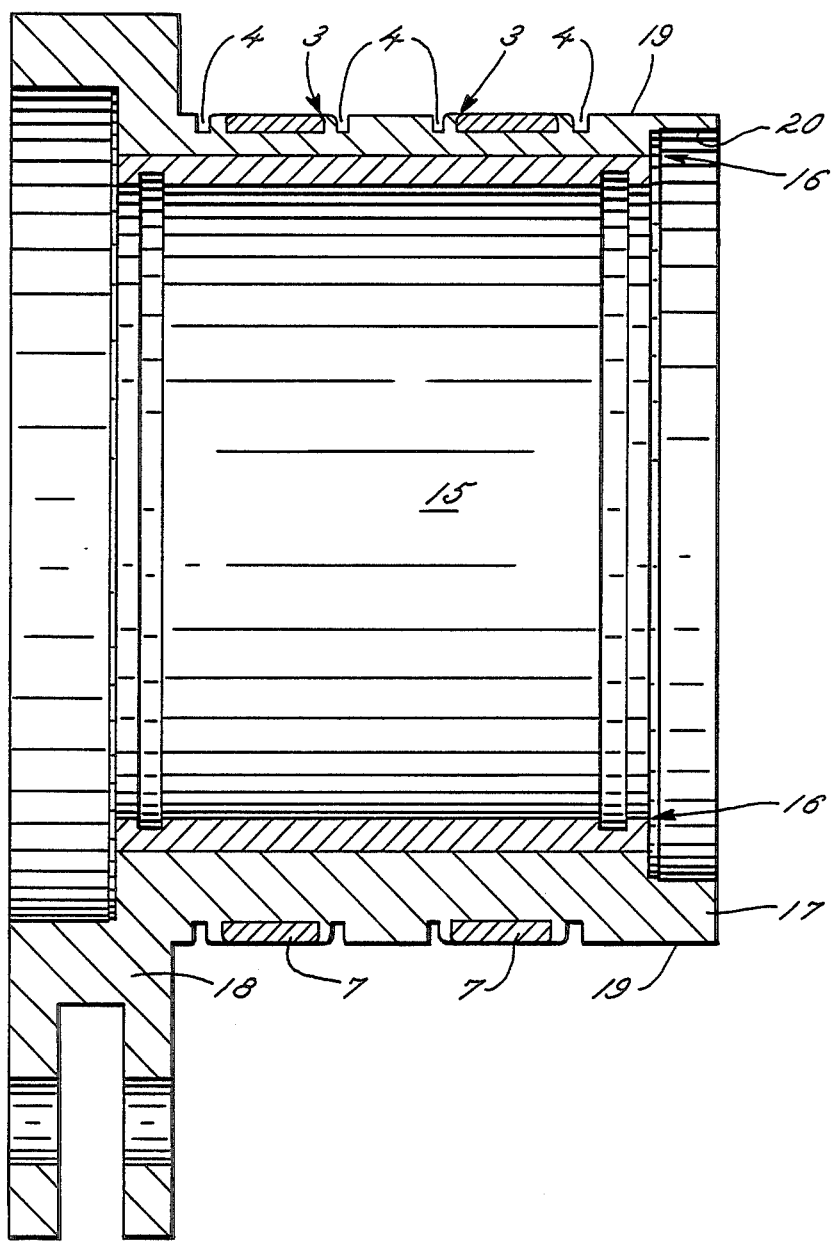
FIG. 3 is a sectional view through bearing bushing used for mounting a blanket cylinder.

FIG. 3 shows a specific application of such a bearing mounting in accordance with the present invention. In offset printing machine, blanket cylinders are mounted in eccentrically drilled bushing to allow adjustment of the axial distance from an adjacent fixed impression cylinder. The blanket cylinder journal is mounted in a plain bearing 15 which is pressed into the bore 16 of a bearing bushing 17. A projection 18 serves to pivot the bearing bushing 17. To this end, the outer periphery 19 of the bearing bushing 17 is machined eccentrically with respect to the bore 16 and the plain bearing 15 and is provided with bearing zones to receive two cylindrical roller or needle bearings. A race groove 3 and two expanding grooves 4 are provided on the outer periphery 19 of the bearing bushing 17, a set of grooves this kind being provided in each case for each of two inner rings 7. After assembly, the running surfaces 8 of the inner rings 7 are situated substantially level with the outer periphery 19 of the bearing bushing 17. The latter can now easily be inserted into its seat complete with the inner rings 7 and the plain bearing 15. The particular advantage of the mounting described will be apparent from the bearing bushing 17. On the side facing the blanket cylinder the bearing bushing is provided with a guide collar 20 which is disposed eccentrically with respect to the bore 16 but is of a larger diameter than the latter. As a result of the eccentric position of the bore 16 and of the guide collar 20 in relation to the outer periphery 19 of the bearing bushing 17, the remaining wall thickness of the guide collar 20 in the direction of the eccentricity becomes thinner than the thickness of the inner rings 7. Assembly of the inner rings 7 on the shaft diameter illustrated would be impossible in the conventional manner, because the guide collar 20 would have to be omitted. The extremely compact construction is very clear here. The use of the mounting for races as described is not restricted to the example given.

We claim as our invention:

1. A mounting arrangement for the inner race of a roller bearing or the like comprising, in combination, a thin-walled cylindrical bearing race made of hardened metal, said race being axially split in one place around its circumference and formed with beveled end faces such that the radially outer running surface of said race is narrower than its radially inner support surface, a mounting member having a cyllindrical groove formed therein circumferentially dimensioned to receive the inner surface of said race, said groove being defined axially by a pair of narrow, substantially circumferential webs disposed substantially parallel to one another and extending generally radially outwardly form said groove, said mounting member being made of metal softer than said race and said webs being deformable against said beveled end faces of said race to hold said race securely in said groove.

2. A mounting arrangement as defined in claim 1 wherein said mounting member is formed with a pair of additional substantially circumferential grooves, each one of said additional grooves being disposed adjacent a respective one of said webs on the side thereof opposeite said race receiving groove and said additional grooves being dimensioned to receive a tool for deforming said webs against said beveled end faces of said bearing race.

3. A mounting arrangement as defined in claim 1 wherein said race receiving groove is formed with a radially inwardly stepped-down portion adjacent each of said webs.

4. A mounting arrangement as defined is claim 2 wherein each a said webs is formed with a beveled outer corner adjacent said additional groove, said beveled corner serving as a lead-in for said deforming tool.

5. A mounting arrangement as defined in claim 2 wherein said mounting member is formed with a pair of axially spaced race receiving grooves each having a pair of circumferential webs and additional grooves adjacent thereto.

6. A mounting arrangement as defined in claim 3 wherein said mounting member is formed with a pair of axially spaced race receiving grooves each having a pair of circumferential webs and each of said race receiving groove being formed with a radially inwardly stepped-down portion adjaceant each of said webs.

7. A mounting arrangement as defined in claim 4 wherein said race receiving groove is formed with a radially inwardly stepped-down portion adjacent each of said webs.

* * * * *